United States Patent
Beveridge et al.

(10) Patent No.: US 9,250,854 B2
(45) Date of Patent: Feb. 2, 2016

(54) USER INTERFACE VIRTUALIZATION FOR REMOTE DEVICES

(71) Applicant: VMware, Inc., Palo Alto, CA (US)

(72) Inventors: Daniel James Beveridge, Apollo Beach, FL (US); Charles Andrew Hirstius, Crystal Lake, IL (US); Andre Leibovici, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 458 days.

(21) Appl. No.: 13/646,993

(22) Filed: Oct. 8, 2012

(65) Prior Publication Data

US 2013/0290856 A1    Oct. 31, 2013

Related U.S. Application Data

(60) Provisional application No. 61/638,469, filed on Apr. 25, 2012.

(51) Int. Cl.
| | |
|---|---|
| *G06F 15/16* | (2006.01) |
| *G06F 3/01* | (2006.01) |
| *G06F 3/14* | (2006.01) |
| *G06F 9/44* | (2006.01) |

(52) U.S. Cl.
CPC ............ *G06F 3/1454* (2013.01); *G06F 9/4445* (2013.01)

(58) Field of Classification Search
CPC .................................. G06F 15/16; G06F 3/01
USPC ......................................................... 715/740
See application file for complete search history.

(56) References Cited

U.S. PATENT DOCUMENTS

| | | |
|---|---|---|
| 6,920,480 B2 | 7/2005 | Mitchell et al. |
| 7,020,721 B1 | 3/2006 | Levenberg |
| 7,676,549 B2 | 3/2010 | McKeon et al. |
| 2002/0111995 A1 | 8/2002 | Mansour et al. |
| 2004/0239681 A1 | 12/2004 | Robotham et al. |
| 2008/0255852 A1* | 10/2008 | Hu ................................ 704/275 |
| 2010/0082733 A1 | 4/2010 | Bernstein et al. |
| 2010/0269152 A1* | 10/2010 | Pahlavan et al. ................... 726/3 |
| 2011/0138295 A1 | 6/2011 | Momchilov et al. |
| 2011/0246904 A1 | 10/2011 | Pinto et al. |
| 2011/0314093 A1 | 12/2011 | Sheu et al. |
| 2012/0042271 A1 | 2/2012 | Ma et al. |
| 2014/0082512 A1 | 3/2014 | Neuert et al. |

OTHER PUBLICATIONS

Extended European Search Report, dated Jul. 22, 2013, Application No. EP 13164249.8, 7 pages.
Cheng-Li Tsao: "SmartVNC: An Effective Remote Computing Solution for Smartphones", Sep. 23, 2011, pp. 13-24, XP055070896, ACM, [retrieved from the Internet Jul. 11, 2013].
Australian Office Action Patent Application No. 2013204723 dated Nov. 12, 2014, 3 pages.

* cited by examiner

*Primary Examiner* — Andrea Leggett

(57) ABSTRACT

User interface virtualization describes a technique for providing a user with access to one computing device from another computing device, while translating the ergonomics of one computer's user interface style into the ergonomics of the other's. An agent running on a remote desktop collaborates with a corresponding client running on a client machine that accepts a "touch and swipe" style input. The agent and client exchange user interface metadata and user interface input events and translate the exchanged information to provide native graphical user interface elements (at the client machine) and simulated user actions (at the remote desktop). The agent running on the remote desktop may use an interface interaction API or library to programmatically manipulate the user interface of the remote desktop responsive and act as a proxy for the corresponding client.

20 Claims, 5 Drawing Sheets

USER INTERFACE VIRTUALIZATION FOR REMOTE DEVICES

CROSS-REFERENCE TO RELATED APPLICATION(S)

This application claims the benefit of U.S. Provisional Patent Application No. 61/638,469, filed Apr. 25, 2012, and entitled "User Interface Virtualization," the entire contents of which are incorporated by reference herein.

This invention is related to U.S. patent application Ser. No. 13/217,484, filed Aug. 25, 2011 and entitled "Native Viewer Use for Service Results from a Remote Desktop", the entire contents of which are incorporated by reference herein. This invention is also related to U.S. patent application Ser. No. 13/362,854, filed Jan. 31, 2012 and entitled "Multi-Touch Interface Gestures for Keyboard and/or Mouse Inputs", the entire contents of which are incorporated by reference herein.

BACKGROUND

Server-based computing allows a networked client device, remotely situated with respect to a server computing system, to access computing resources on the server. For example, the client device may run desktop remoting client software and hardware that uses a remote desktop protocol, such as Remote Desktop Protocol (RDP), Virtual Network Computing (VNC), or Personal Computer over Internet Protocol (PCoIP), to access a desktop remotely. The desktop remoting client software displays an image of a graphical user interface generated by the operating system and applications running at the server computing system, e.g., in a virtual machine. The term "desktop" can refer to a virtual machine or physical system accessed by an end user as a local (to the user) desktop or workstation computer. The term "desktop" may also refer to the human interface environment through which users can launch, interact with, and manage applications, settings, and data. The remote desktop is accessible by the user using the remote desktop protocol and a desktop remoting client. The client device typically has a local set of input and output devices (e.g., display, keyboard, mouse) and transmits user input such as keyboard or mouse input to the remote system to be processed there and receives display and other data sound) for presentation to the user using the local set of I/O devices.

However, users of client devices with touch-screens face several challenges when interfacing with traditional desktop-based applications (e.g., Microsoft Windows® applications) and desktops through a remote display protocol. One challenge relates to latency of the network connection between the touch-screen device and the remote desktop, which often creates a halting or jittery user experience. Another challenge relates to attempts to remotely control a, conventional "point-and-click" driven interface (e.g., Windows® interface) from a touch-screen device which is designed not for traditional "point-and-click" interactions, but rather, for touch-screen gestures and "finger swipe" style of interactions.

To address these challenges, it is known in the art to modify a remote desktop controlled by touch screen devices, for example, by automatically adjusting a font size of the remote desktop. However, these largely cosmetic changes only modify the displayed contents received from the remote server, do not fail to reduce latency in menu navigation and user feedback, and still require users to navigate desktop applications through a "point-and-click" style interface.

It is also known in the art, as described in "Remote Desktop Protocol: Graphics Device Interface Acceleration Extensions" made available by Microsoft Inc., for a remote server to use its own video driver to render display output and encoding drawing operations that produce an image instead of encoding the actual image. For example, instead of sending a bitmap image of a filled rectangle from server to client, an order to render a rectangle at coordinate (X,Y) with given width, height, and fill color may be sent to the client. The client then executes the drawing order to produce the intended graphics result. However, this approach only produces a same corresponding graphical interface on the client as on the server, which are difficult to use on a client device having a touch-screen or non-pointer based style of interface.

Alternatively, it is also known in the art, as described in United States Patent Publication No. 2011/0314093 A1, to translate user gestures on a client device into a digital representation of a remote computer's native input format, such as a control common to a two-button mouse (e.g., click, window scroll, right click), thereby allowing the client device to control the computer. However, this approach forces a user to learn a new user interface and memorize which touch screen gestures is equivalent to a mouse input, which can be cumbersome hard to use. Further, this approach still requires capturing and displaying basic screen data from the remote desktop and does not improve latency in interactions between the user and the user interface.

Consequently, there is a need for improved systems and methods for providing access to a remote desktop having one style of user interface to a client device having a different style of user interface.

SUMMARY

One or more embodiments of the present invention provide a method of generating a local graphical user interface (GUI) on a touch screen of a client device that is connected to a server device having a remote GUI. The method includes receiving, from the server device, a base image of the remote GUI and user interface (UI) metadata describing a GUI element in the remote GUI. The method further includes generating, at the client device, a native GUI element to be displayed on the touch screen according to the received UI metadata. The native GUI element corresponds to the GUI element in the remote GUI. The method includes generating the local GUI to be displayed on the touch screen of the client device, where the local GUI includes the base image received from the server device and the native GUI element.

Embodiments of the present application provide a method of providing access to a graphical user interface (GUI) of a server device having a guest operating system executing therein. The method includes generating user interface (UI) metadata specifying a GUI element in the GUI of the server device using an application programming interface of the guest operating system configured to programmatically manipulate the GUI of the server device. The method further includes transmitting abuse image of the GUI and the generated UI metadata to a touch input client device connected to the server device, and receiving, from the touch input client device, information indicating user input linked to the GUI element in the GUI of the server device. The method includes invoking the application programming interface to programmatically manipulate the GUI of the server device according to the received information.

Embodiments of the present application further provide a method of generating a local graphical user interface (GUI) on a client device that is connected to a server device having a remote GUI. The method includes receiving, at the client device, a voice input through an input device of the client device, and processing the voice input to determine a command input to manipulate the remote GUI of the server device. The method includes transmitting, to the server device, information indicating that the command input configured to manipulate the remote GUI.

DETAILED DESCRIPTION

Embodiments of the invention provide a technique and system for user interactions on a client system with one user interface scheme (e.g., touch screen) to remotely operate a server system with another user interface scheme (e.g., "point-and-click" desktop). In one embodiment, a virtual desktop infrastructure (VIM) uses an application programming interface (API) configured to programmatically manipulate and activate graphical user interface (GUI) elements of the server-side desktop to bridge the difference in user interface schemes between the touch screen client system (e.g., tablet computer, smart phone) and server-side desktop.

For example, application frameworks and Application Programming Interfaces (APIs), such as Microsoft Active Accessibility API and Microsoft UI Automation API, may derive contents of UI elements, such as menu navigation, at the server-side desktop which are then passed to the remote client system (e.g., tablet computer) over a network connection (e.g., via desktop remoting protocols). The menu contents are rendered as a native GUI element and engaged on the remote client directly. A user of the remote client can select menu options, launch applications and documents, and perform other common "point-and-click" activities directly on the tablet using a local touch-friendly rendition of these menus.

In another example, APIs configured to manage file and filesystems at the server-side desktop (e.g., File Explorer APIs) may be used to facilitate export of document folders for direct document launches and other file functions on the client device. In yet another example, APIs configured to manage process and threads at the server-side desktop (e.g., Application Process API's) allow remote launch and termination of applications using icons on the client device. By shifting key user interface activities such as menu operation, document operations, and application launches from the remote desktop running at the server to the client, embodiments of the invention dramatically improve user experience of traditional point-and-click applications used on touch screen devices, and augment the traditional remote display protocol driven user experience.

In the following description, numerous specific details are set forth in order to provide a thorough understanding of exemplary embodiments of the present invention. However, it will be apparent to one skilled in the art that the present invention may be practiced without some of these specific details. In other instances, well known process operations and implementation details have not been described in detail in order to avoid unnecessarily obscuring novel aspects of the invention.

Figure 1:
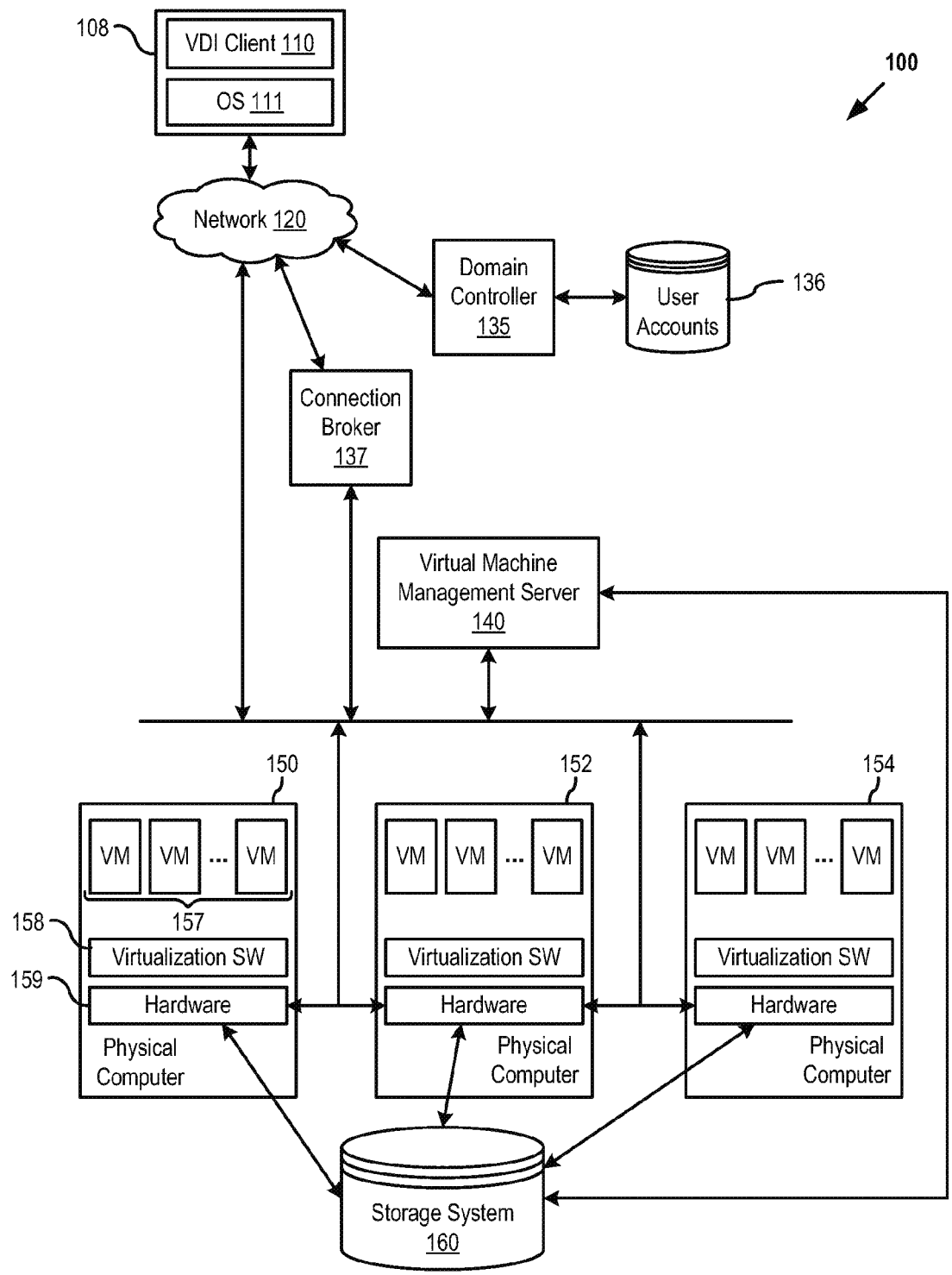
FIG. 1 illustrates components of a virtual desktop infrastructure (VDI) system in which one or more embodiments of the present invention may be implemented.

FIG. 1 illustrates components of a VDI system 100 in which one or more embodiments of the present invention may be implemented. In VDI system 100, VDI client software programs (also referred to as "Val clients" for short), e.g., VDI client 110, run on operating systems of local computing devices, e.g., client machine 108 on top of an operating system (OS) 111. VDI clients provides an interface for the users to access their desktops, which may be running in one of virtual machines 157 or blade server (not shown) in a data center that is remote from the users' locations. The term "desktop" may refer to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 may include a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 are instantiated on a plurality of physical computers 150, 152, 154, each of which includes virtualization software 158 and hardware 159. Physical computes 150, 152, 154 may be controlled by a virtual machine management server 140, and be coupled to a shared persistent storage system 160.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Figure 2:
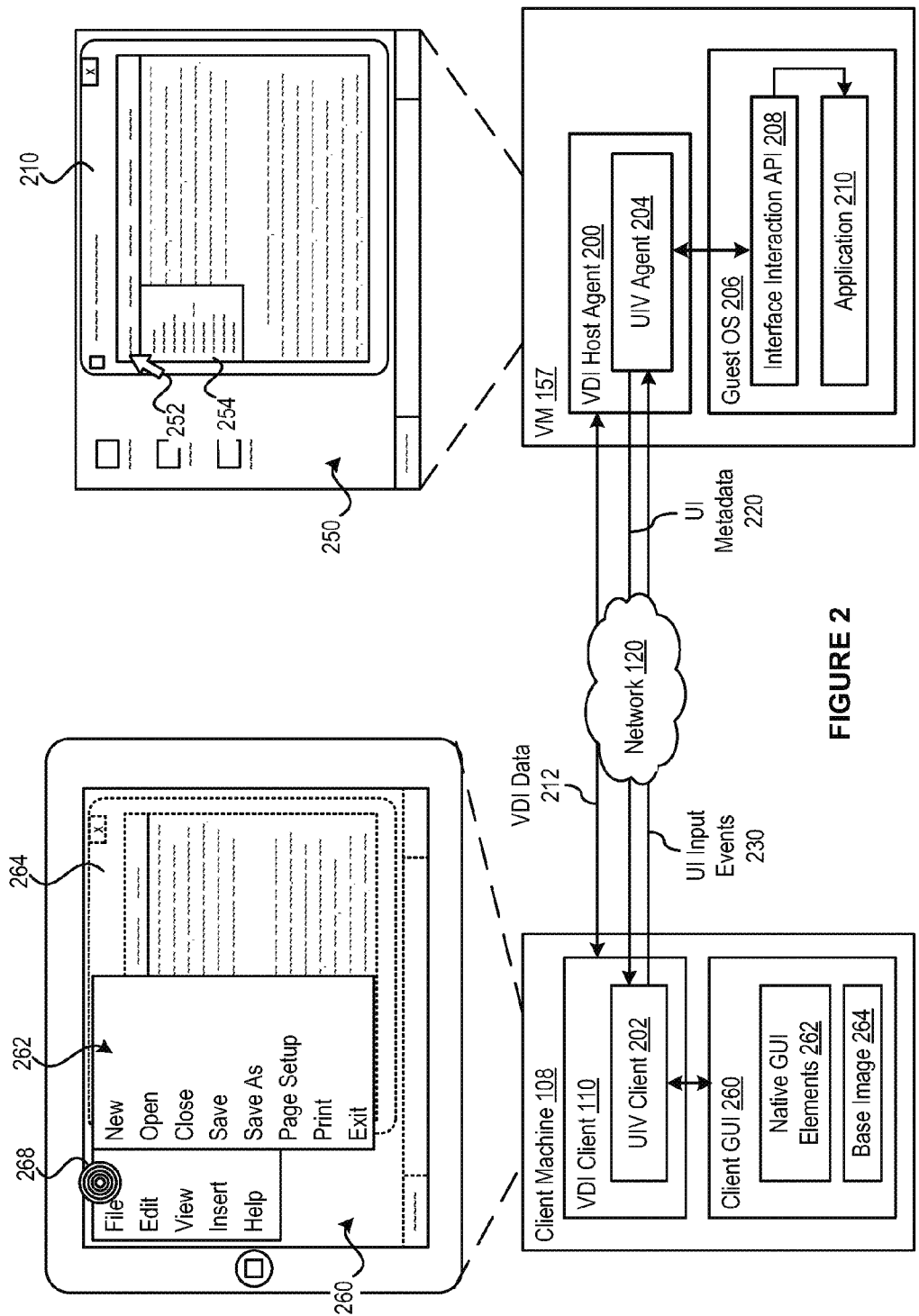
FIG. 2 illustrates in greater detail components of the VDI system in FIG. 1, according to one embodiment of the present invention.

FIG. 2 illustrates in greater detail components of VDI system 100 having a VDI client 110 that enables a user to access a desktop 250 running on VM 157 over network 120. VDI client 110 executing on client machine 108 and communicating with a VDI host agent 200 running in VM 157 to exchange VDI data 212 and provide user access to remote desktop 250. In the embodiments described herein, client machine 108 may be any computing device having an integrated display output and touch screen input. However, the invention should not be understood as being limited to these particular devices. For instance, alternate output devices such as a braille reader, and alternate input devices, such as voice activation (as further described below) may be utilized. Client machine 108 typically has a "touch-and-gesture" style user interface that may differ from the "point-and-click" user interface of the desktop running on VM 157.

As shown in a call-out in FIG. 2, desktop 250 may include an application 210 having a traditional "point-and-click"-style user interface that relies on input from a pointer (e.g., mouse cursor 252) to manipulate or interact with UI elements 254 of application 210. The difference in styles of user interface between client machine 108 and desktop 250 may worsen user experience and turn routine user tasks into frustrating exercises. This problem is especially clear from FIG. 2. Here, the graphical user interface of remote desktop 250 may have widgets and elements that expect manipulation and interaction with a smaller, more precise pointer (e.g., mouse cursor 252), and as such may have a small size that is difficult to target with a touch input (illustrated as circle 268).

According to an embodiment, VDI client 110 includes a user interface virtualization (UIV) client 202 configured to communicate with a corresponding UIV agent 204 running on VM 157 to translate between the "point-and-click" style user interface of the user desktop on VM 157 and the "touch-and-gesture" user interface of client machine 108. In one embodiment, UIV client 202 and UIV agent 204 exchange messaging in the form of UI input events 230 and UI metadata 220 which are translated into remote desktop input and native GUI elements, respectively, at the appropriate endpoints.

In one embodiment, UIV agent 204 executing on VM 157 is configured to invoke an interface interaction API 208 to obtain metadata related to user interface (UI) widgets and elements seen on the desktop of VM 157. In one embodiment, interface interaction API 208 may be an API exposed by guest OS 206 to obtain metadata related to user interface (UI) widgets and elements seen on the desktop of VM 157. For example, interface interaction API 208 may be an API traditionally used by assistive technologies (e.g., screen readers) to make an application running on a guest OS or the guest OS itself more accessible to persons with vision, hearing, or motion impairments, for example, such as Microsoft Accessibility API, or automate software testing, such as Microsoft UI Automation API. Interface interaction API 208 is further configured to expose functionality of UI elements by enabling programmatic access (e.g., for UIV agent 204) to identify, manipulate, and interact with UI elements of guest OS 206 and applications 210 running on guest OS 206.

In an alternative embodiment, interface interaction API 208 may be a software framework configured to build an application model over time, including performing GPS-style "recalculation" to determine efficient ways to activate any application function from any other point in an application's interface. Such "recalculation" functionality may be useful to insure injection of user input even when something goes wrong and an application's state is not what VDI client 110 expects at the point where a proxied action is sent to desktop-side UIV agent 204. In one embodiment, interface interaction API 208 is configured to intercept UI elements, determine state of an application and its application objects, and perform simulated user actions on the UI elements.

VDI host agent 200 is configured to transmit VDI data 212 to VDI client 110 having display and input data according to conventional remote desktop techniques. VDI data 212 may include a base GUI image 264 that is used to display the GUI of remote desktop 250 at client machine 108. In some embodiments, base GUI image 264 may be a graphical bitmap or framebuffer illustrating a portion of or an entirety of the display at desktop 250, similar to a screenshot of the remote desktop. In other embodiments, base GUI image 264 may be graphical information for drawings lines, polygons, and other shapes, fonts, and graphical primitives to render an image that displays the GUI of desktop 250 at client machine 108.

In addition to VIM data 212 transmitted between VDI client 110 and VDI host agent 200, UIV agent 204 executing on VM 157 is configured to transmit UI metadata 220 to UIV client 202 on client device 108. UI metadata 220 includes information provided by interface interaction API 208 that are descriptive of one or more UI elements of the user desktop on VM 157. Examples of UI elements that may be specified by UI metadata 220 include windows, buttons, menus, dialog or message boxes, lists, menu bars, scroll bars, title bars, status bars, size grips, toolbars, tree view controls, list view controls, dropdown lists, and input carets. In contrast to previous approaches which used graphical primitives or drawing operations for rendering at a VDI client, UI metadata 220 includes semantic information related to contents and application state of one or more UI elements of the user desktop. For example, rather than merely providing graphical primitives for drawing a rectangle menu, 111 metadata 220 provides semantic information representing the contents of the menu, such as the selectable options in the menu. Based on UI metadata 220, VDI client 110 may independently render GUI elements that display, behave, and are interacted with differently than corresponding UI elements on the user desktop on VM 157. As such, UI metadata 220 enables VDI client 110 to generate, render, and display native GUI elements that are most appropriate for the interface style and form factor of client machine 108 (e.g., touch screen). In one embodiment, information in the UI metadata 220 may be organized into a hierarchical or tree-like data structure having root elements and child elements corresponding to UI elements of a user desktop, as shown in greater detail in FIG. 3.

Figure 3:
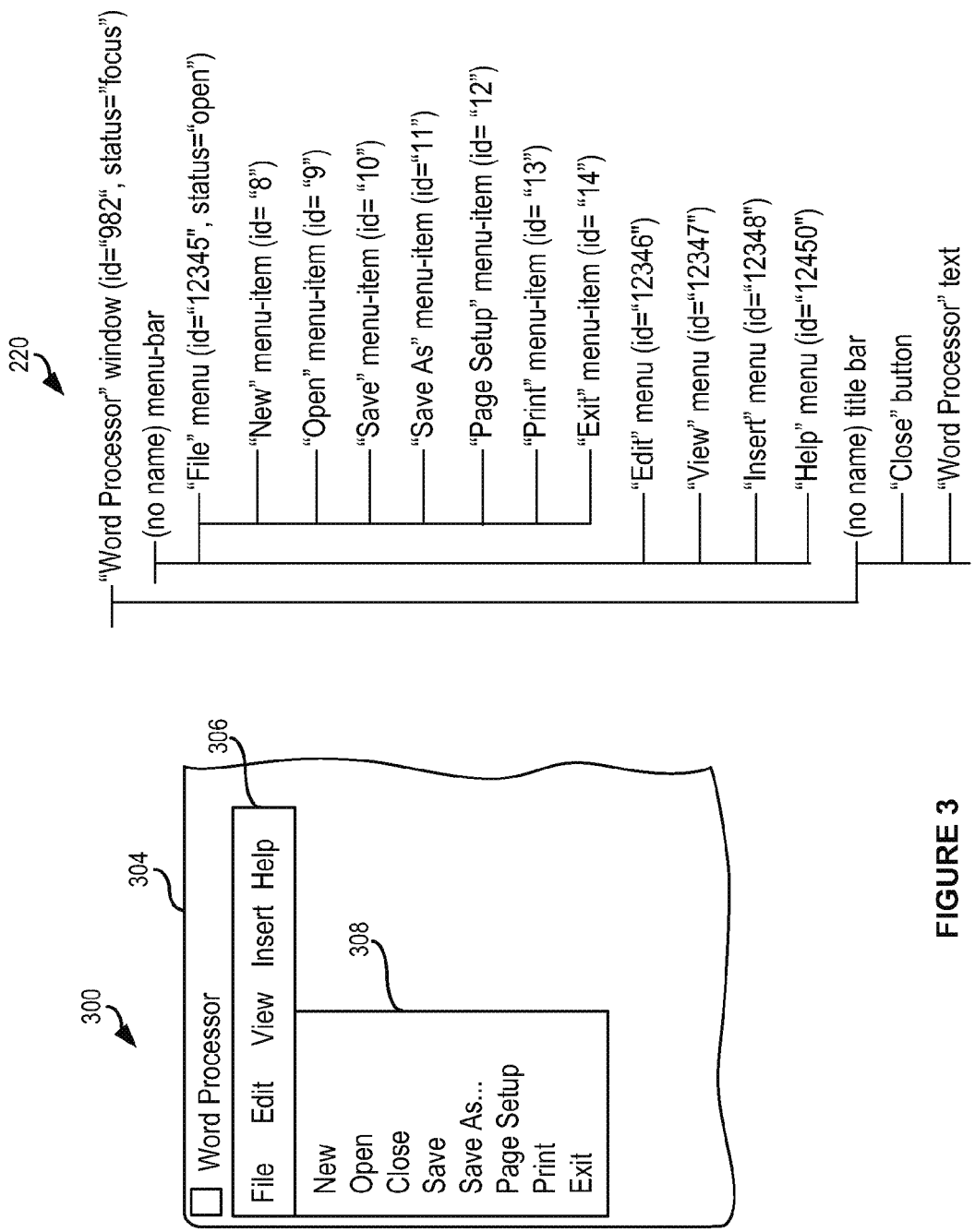
FIG. 3 illustrates a graphical user interface having a plurality of UI elements and corresponding metadata, according to one embodiment of the present invention.

FIG. 3 illustrates a graphical user interface 300 for an application 210 having corresponding UI metadata 220, according to one embodiment of the present invention. Graphical user interface 300 may be made of UI elements and sub-elements. As shown, graphical user interface 300 of application 210 includes a window 304 having a menu bar 306 with a plurality of menu options (e.g., "File," "Edit," "View," "Help," etc). Each of these menu options may activate a submenu 308 which contains further options (e.g., "New," "Open," "Save," "Exit," etc.) and possible pop-out menus or dialog boxes.

In one embodiment, interface interaction API 208 allows application 210 to expose a tree structure of UI metadata 220 that represents the structure of graphical user interface 300. Elements in the tree expose properties and methods that facilitate programmatic manipulation of the GUI on desktop 250. In one embodiment, UI metadata 220 may include, for each UI element specified, a label for a UI element that is predetermined (e.g., assigned in code by a developer of application 210 and guest OS 206); role information describing the type of UI element (e.g., ROLE_SYSTEM_PUSHBUTTON); properties that describe a UI element's state at a given moment in time (e.g., invisible, unavailable, focused, focusable, pressed, etc); and other values contained in a UI element (e.g., percentages, integers, non-integers, textual, visual) that may indicate information represented by the UI element. For example, UI metadata 220 may include information for window 304 that includes an identifier (e.g., id="982"), a state property indicating a window 304 is in "focus" within the remote desktop, and information for UI elements contained within window 304 (e.g., title bar and menu bar 306). In another example, metadata for menu 308 includes information for a plurality of menu items within menu 308, such as items for "New," "Open," "Save," etc. In some embodiments, UI metadata 220 may include graphical data, such as thumbnails or icons, associated with UI elements on desktop 250.

Referring back to FIG. 2, UIV client 202 is configured to construct and display a "native" UI element or widget having the same functionality and information as a corresponding UI element or widget on the remote desktop based on UI metadata 220 received from UIV agent 204. In one embodiment, UIV client 202 may generate a native, "touch-and-gesture"-style GUI element 262 that corresponds to "point-and-click"-style UI element 254 based on UI metadata 220 provided by interface interaction API 208. In some embodiments, native GUI elements 262 generated by UIV client 202 may be different than corresponding UI elements of desktop, such as having differences in size, shape, color, style, manner of interaction, animation, and interactive behavior. For example, UIV client 202 may use UI metadata 220 derived from a conventional drop-down list on remote desktop 250 to generate a native GUI element that appears like a large wheel that spins in response to swipe gestures. In another example, UIV client 202 may present a reformatted version of a navigation menu optimized for the form factor and touch-screen ergonomics of client machine 108. As shown, a native GUI element 262 may be overlaid on top of base GUI image 264 represented in VDI data 212 to form a client GUI 260. In one embodiment, UIV client 202 is configured to use native graphical frameworks or user interface frameworks that are local to client machine 108 to render one or more native GUI elements based on the received UI metadata 220.

UIV client 202 is further configured to capture user input on the constructed native GUI element 262 and transmit UI input events 230 to UIV agent 204 running in VM 157. In one embodiment, UIV client 202 is configured to generate UI input events 230 based on touch input 268 that represents interactions with the native GUI element 262. In one embodiment, UI input events 230 include information indicating that the corresponding GUI elements at the remote desktop 250 on VM 157 have been manipulated at the client machine 108. In some embodiments, UI input events 230 may indicate a selection of activation of, change of state in, or interaction with a corresponding UI element or option at remote desktop 250. In other embodiments, UI input events 230 may indicate execution or invocation of an operation or option corresponding to a UI element at remote desktop 250. According to UI input events 230 received from UIV client 202, UIV agent 204 is configured to query and invoke the corresponding UI elements of application 210 or guest OS 206 using interface interaction API 208 to simulate input and facilitate programmatic manipulation of the user interface of the remote desktop on VM 157.

Figure 4:
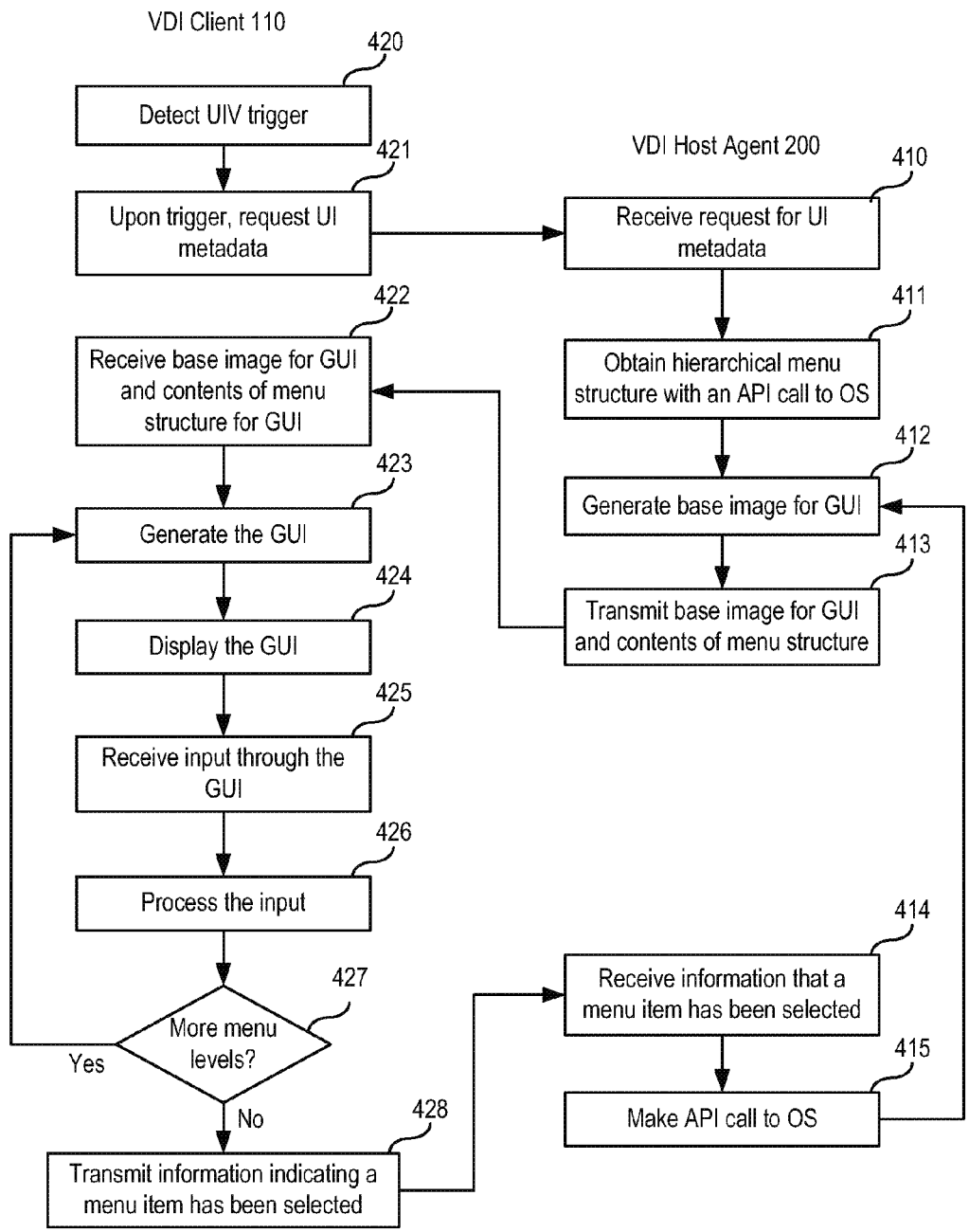
FIG. 4 illustrates a flow diagram for generating and updating a graphical user interface for an application that has been launched in a remote desktop and is to be displayed at a VDI client, according to one embodiment of the present invention.

FIG. 4 illustrates a flow diagram for generating and updating a GUI for an application that has been launched in a remote desktop and is to be displayed at a VDI client. Steps 410-415 are carried out by VDI host agent 200 running in a virtual machine that is hosting the remote desktop. Steps 420-427 are carried by VDI client 110. While FIG. 4 describes exemplary steps for providing menu navigation according to an embodiment of the disclosure, it should be recognized that techniques described herein may be extended to other UI experiences, including file dialogs, clipboard functions, launching of applications and documents, desktops, and application-specific experiences.

At step 420, VDI client 110 detects a UIV trigger performed by a user operating client machine 108. In one embodiment, the UIV trigger may be a pre-determined gesture (e.g., a unique swipe gesture) performed by the user or a UI button activated by the user that indicates VDI client 110 should render one or more UI elements of an active application running on the remote desktop (e.g., application 210) using native GUI elements. At step 421, responsive to detecting a UIV trigger, VDI client 110 requests UI metadata from VDI host agent 200, which receives the request at step 410.

At step 411, in response to receiving a request for UI metadata, VDI host agent 200 makes an API call to interface interaction API 208 of guest OS 206 to obtain UI metadata (e.g., UI metadata 220) for application 210. For example, VDI host agent 200 may obtain a hierarchical menu structure having a list of menus, sub-menus, and menu items of an in-focus application. In one embodiment, rather than return metadata for every UI element on the remote desktop, UIV agent 204 may identify a subset of UI elements of the user desktop, and generate UI metadata 220 only for the subset of UI elements. For example, UIV agent 204 may only generate UI metadata for the application that currently has focus, in another embodiment, TAN agent 204 may generate UI metadata for one or more UI elements on the remote desktop based on the received request for UI metadata. For example, UV agent 204 may generate UI metadata for the hierarchical menu bar based on a request from VDI client 110 that indicates only menu metadata are requested. In some embodiments, VDI host agent 200 may proactively request UI metadata from guest OS 106 in response to detected changes in the active application or the underlying guest OS 106 (e.g., via events received via a Windows Event callback function).

At step 412, VDI host agent 200 generates a base image for the GUI (e.g., according to a VDI protocol established between VDI client 110 and VDI host agent 200) and transmits the base image for the GUI along with the contents of the hierarchical menu structure to VDI client 110 at step 413. As described above, the base image (e.g., base GUI image 264) provides graphical information for displaying an image of the remote desktop at the client machine. In one example, the base image may be raw pixel data, similar to a screenshot, of the entire desktop 250 to be displayed at the client machine. In another example, the base image may be an updated set of pixel data to changing at least a portion of earlier-transmitted raw pixel data. In some embodiments, the base image may be drawing operations and graphical primitives for drawing the display of the remote desktop within a client GUI of the client machine.

In one embodiment, the UIV client 202 and UIV agent 204 may use a messaging bus or message passing service to transmit and receive UI input events 230 and UI metadata 220 across network 120. In another embodiment, VDI host agent 200 may incorporate UI metadata. 220 within VDI data 212 passed through a remote display channel (e.g., PCoIP, HTML5) to VDI client 110. Similarly, VDI client 110 may incorporate UI input events 230 within VDI data 212 transmitted to VDI host agent 200.

At step 422, VDI client 110 receives the base image for the GUI along with the contents of the hierarchical menu structure. At step 423, VDI client 110 renders the GUI based on the received base image and contents of the hierarchical menu structure, and at step 424, displays the GUI. The displayed GUI includes the base image received from VDI host agent 200 and native GUI elements (i.e., native to client machine 108 in which VDI client 110 is executed) that VDI client 110 generated based on the contents of the menu structure. In some embodiments, the native GUI elements are included in the displayed GUI as UI elements overlaid on top of the base image received from VDI host agent 200. In some embodiments, the native GUI elements are included in the displayed GUI as a semi-transparent layer incorporated into the base image received from VDI host agent 200. In one embodiment, VDI client 110 generates native GUI elements configured to be "touch-friendly." For example, VDI client 110 generates native GUI elements having a size and shape that more readily facilities activation by a touch object (e.g., human finger or stylus) as compared to a GUI element configured for activation by a pointer or mouse cursor. In another example, VDI client 110 generates native GUI elements responsive to touch-based input and gestures, including taps, swipes, multi-point gestures, etc. As such, the user experiences an improved user interface because VDI client 110 enables the user to interact with native GUI elements that are rendered in a touch-friendly manner yet correspond to UI elements from the remote desktop. Furthermore, embodiments of the present invention may use native graphical frameworks or user interface frameworks that are local to client machine 108 thereby offloading work and relying on the graphical capabilities of client machine 108.

At step 425, VDI client 110 detects an input (e.g., a touch screen input) made by the user through the GUI onto the native GUI elements, in response to detecting an input, VDI client 110 processes the input at step 426. In the example of the hierarchical menu structure, the input may of a type that causes menu items of a lower level to be displayed or may be a final selection. If it is the former, the flow returns to step 423 where the GUI is generated for display again. If the input is a final selection from the menu, information (e.g., UI input events 230) indicating that a certain menu item has been selected is transmitted to the VDI host agent at step 426.

At step 414, the VDI host agent receives the information indicating that the certain menu item has been selected. At step 415, the VDI host agent makes an API call (e.g., to interface interaction API 208) to the guest OS to communicate that the certain menu item has been selected. The flow then returns to step 411 where the base image for GUI may be regenerated.

In some embodiments, the VIM host agent programmatically manipulates the user interface of the guest OS using an identifier that specifies an object within an object model of guest OS 206. In contrast to previous approach which simply invoked the server's keyboard and mouse driver to simulate keyboard and mouse events, UV agent 204 uses interface interaction API 208 to directly manipulate UI elements of desktop 250 according to the UI input events received from the VDI client. In some embodiments, UIV agent 204 passes the received UI input events directly to interface interaction API 208, in cases where UV client 202 transmits UI input events that are already configured for use by interface interaction API 208. In other embodiments, UIV agent 204 translates received UI input events into events or parameters for interface interaction API 208 to indicate application state or property values of one or more UI elements have been changed. By way of example, LTV agent 204 may use interface interaction API 208 to indicate, for a given UI element, element activation, element selection, spatial navigation, logical navigation, alerts, focus changes, and other property value changes.

According to one embodiment, VDI client 110 improves latency and responsiveness for UI elements that require multiple user interactions, such as scrolling through items in a drop-down list, or navigating menus and sub-menus. In one example use case, menu navigation on a desktop may involve pointing and clicking on a "Edit" menu button, causing a drop-down menu to appear, pointing and clicking on a menu item, which may cause additional menus to appear (e.g., "Paste Special . . . ", etc.). To perform this use case under previous approaches to remote desktops, a VDI client might have to receive an image of a GUI for the window and menu bar over the remote network, and render the appearance of the window menu bar (which might include frames of GUI animation); transmit click input; receive an image of a GUI for the window, menu bar, and now Edit menu over the remote network, and render the appearance of the window, menu bar, and now Edit menu; transmit click input (possibly for one of the menu items), and so forth. In contrast, embodiments of the invention enable VDI client 110 to construct and modify native GUI elements using UI metadata without having to make repeated network requests which increase latency and create a "laggy" user experience. In fact, embodiments of the invention provide a means of accessing menu navigation metadata within an application even before a user selects a menu option. Interface-related operations that use graphical feedback, like drag-and-drop, box resizing, and key animations, are performed locally on the client device, for example, as a remote session overlay, and then executed within the remote session.

While embodiments of the present invention describe a remote desktop system that generates native GUI elements of a touch-based, gesture-driven interface configured for a touch screen on a client device, various embodiments of the client device described herein may include alternative non-touch-based input devices, such as a microphone, accelerometer, gyroscopic sensor, near-field communications sensor, etc., that may be configured to control a remote desktop according to techniques described herein. One example alternative embodiment of the VIM system 100 in FIG. 1 having a client device with alternative input devices for controlling a remote desktop is shown in FIG. 5.

Figure 5:
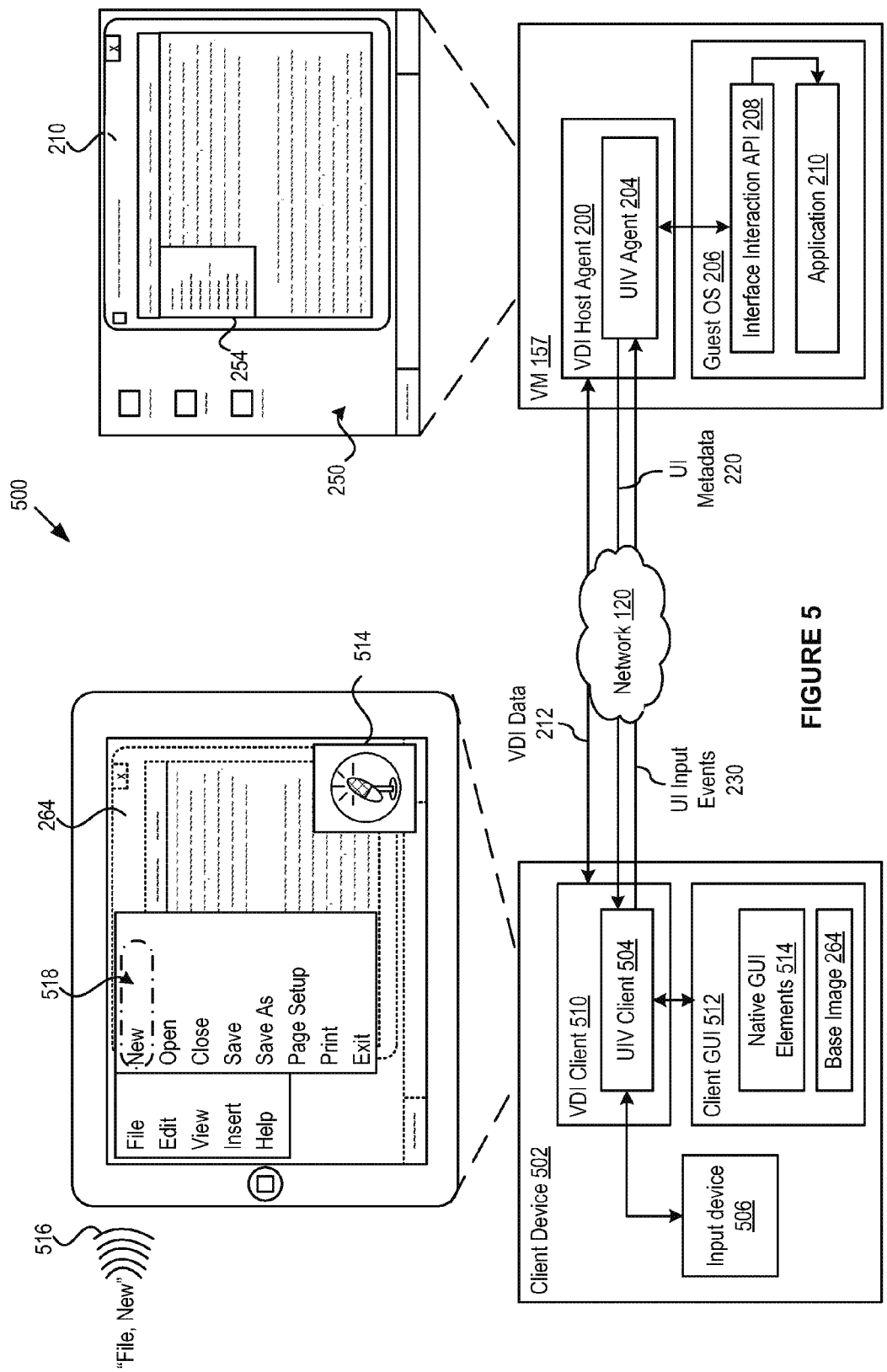
FIG. 5 illustrates an alternative embodiment of the VDI system in FIG. 1 having a client device with alternative input devices for controlling a remote desktop, according to one embodiment of the present invention.

FIG. 5 illustrates components of a VDI system 500 having a client device 502 having an input device 506 and that enables a user to access a desktop 250 running on VM 157 over network 120. In the embodiment described herein, client device 502 may be any computing device having a display output and input device 506 that provides a style of user interface that may differ from the "point-and-click" user interface offered by a pointer input (e.g., mouse cursor 252) in desktop 250. Examples of input device 506 include a microphone, accelerometer, gyroscopic sensor, near-field communications sensor, tight sensor, proximity sensor, etc.

According to one embodiment, a val client 510 running on client device 502 is configured to transform a conventional "point-and-click" driven interface on a remote desktop to an interface operable using input device 506. For example, VDI client 510 may be configured to generate a client GUI 512 that incorporates a base GUI image 264 from VDI data 212 and one or more native GUI elements 514 operable by voice (rather than touch-based gestures). In the embodiment shown, in one embodiment, VDI client 510 is configured to generate a native GUI element 514 (depicted in FIG. 5 as a microphone icon) providing graphical feedback from voice input received from the user.

In one embodiment, VDI client 510 is configured to receive an audio input signal 516 from an input device 506 (e.g., microphone) of client device 502 that represents a voice command spoken by a user. UIV client 504 decodes the audio input signal 516 using a speech-to-text engine and transmits a UI input event 230 to UV agent 204 based on the decoded audio signal. For example, UIV client 504 may process a voice command of "Open Excel" from a user to launch an application (e.g., application 210) on desktop 250. UIV client 504 processes the audio input signal 516 to generate command text (e.g., "open excel") and determine a UI input event 230 based on the generated command text. In some embodiments, the speech-to-text engine may generate a text value representing a best-match for a given input audio signal. In some embodiments, the speech-to-text engine may utilize a third-party voice recognition component that may be internal or external (e.g., via a cloud service) for processing the audio signal.

In one embodiment, UIV client 504 is configured to process the command text generated from audio input signal 516 using a rule-based engine that associates command text matching pre-determined commands with one or more UI input events 230. Examples of pre-determined commands may include "Open [Application]", "Show Documents", "Search for [File]". The UIV agent at VM 157 is configured to directly execute one or more commands at the VM 157 based on the UI input events 230 received from UIV client 504. The UIV agent may execute the one or more commands using one or more APIs of guest OS, as described above.

In one embodiment, UIV client 504 may process input from input device 506 using a context awareness provided by UI metadata 220. For example, UIV client 504 may process a voice command of "File, New" from a user to navigate a menu of an application (e.g., application 210) running on desktop 250. UIV client 504 processes the audio input signal 516 to generate command text (e.g., "File New") and determine a UI input event 230 based on the generated command text. In one embodiment, UIV client 504 may process the command text to generate a UI input event 230 using a rule-based engine that includes rules for current context and application state of desktop 250. In some embodiments, UV client 504 may determine a UI input event 230 based on intermediate GUI elements 518 (similar to native GUI elements 262) on client GUI 512. For example, UIV client 504 may determine that the command text "File New" corresponds to intermediate GUI elements 518 (shown as a "File" menu, and a "New" menu-item) currently rendered in client GUI 512.

In one embodiment, UIV client 504 is configured to modify its processing of audio input signal 516 from input device 506 based on UI metadata 220 received from UIV agent 204. UIV client 504 may seed its speech-to-text engine with information from UI metadata 220 to bias values returned by the speech-to-text engine towards particular components on desktop 250. For example, UIV client 504 may use information from UI metadata 220 that indicates which application is active and which UI element has focus to increase or decrease weight of possible matches to candidate texts from a speech-to-text conversion. In the example shown, UIV client 504 may use UI metadata 220 to indicate that a voice command having the word "Open" is more likely intended to refer to the "Open" menu item in GUI element 518 than a pre-determined global command "Open".

In one alternative embodiment, UIV client 504 is configured to generate one or more native GUI elements 514 operable by sensor input, for example, from an accelerometer. For example, UIV client 504 may generate a scrollable UI element that is responsive to input from the accelerometer. UV client 504 is configured to receive motion input or other positional input from the accelerometer and transmit a corresponding UI input event 230 to UIV agent 204. In one example, the transmitted UI input event 230 may cause the corresponding GUI on desktop 250 to scroll in a specified direction and speech (e.g., scroll up, fast). In some embodiments, UIV client 504 may be configured to associate sensor input from input device 506 with one or more UI input events 230 according to a predetermined input mapping. For example, UIV client 504 may receive a rotational input from input device 506, indicating that client device 502 has been manipulated by the user from a landscape to portrait orientation. Based on a pre-determined input mapping, UIV client 504 may translate this rotational input to a UI input event corresponding to a "Maximize Window" interface command, which would be carried out by UIV agent 204.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations, in addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and

What is claimed is:

1. A method of generating a local graphical user interface (GUI) on a client device that is connected to a server device having a remote GUI, the method comprising:
   receiving, from the server device, a base image of the remote GUI and UI metadata describing a GUI element in the remote GUI;
   generating the local GUI to be displayed on the touch screen of the client device, the local GUI including the base image received from the server device and a native GUI element to be displayed on the touch screen, the native GUI element generated according to the received UI metadata, the native GUI element corresponding to the GUI element in the remote GUI;
   receiving, at the client device, a voice input through an input device of the client device;
   processing the voice input to determine a command input to manipulate the remote GUI of the server device; and
   transmitting, to the server device, information indicating the command input configured to manipulate the remote GUI.

2. The method of claim 1, wherein the step of processing the voice input further comprises:
   generating the command input based on a match of a plurality of rules associating a plurality of pre-determined commands with a corresponding input event to be executed at the server device.

3. The method of claim 1, wherein:
   the processing the voice input further comprises processing the voice input to determine a command input to manipulate the remote GUI the native GUI element, wherein the processing is performed based on information from the received UI metadata; and
   the method further comprises transmitting, to the server device, information indicating that the corresponding GUI element in the remote GUI has been manipulated at the client device.

4. The method of claim 3, wherein the step of processing the voice input further comprises:
   determining the command input from a plurality of candidate texts based on the command input matching information from the UI metadata that specifies the GUI element of the remote GUI.

5. The method of claim 1, wherein the UI metadata comprises semantic information related to contents of the GUI element in the remote GUI, wherein the UI metadata is organized in a tree-like structure.

6. The method of claim 1, wherein the generated native GUI element is different than the corresponding GUI element in the remote GUI in at least one of size, shape, color, style, manner of interaction, animation, and interactive behavior.

7. The method of claim 1, wherein the step of generating the native GUI element further comprises:
   generating a system-provided control element based on the received UI metadata using a user interface framework local to the client device.

8. The method of claim 1, wherein the local GUI element comprises the native GUI element arranged on top of the base image of the remote GUI received from the server device.

9. The method of claim 1, further comprising:
   receiving, at the client device, a touch input through the local GUI; and
   responsive to determining that the native GUI element has been manipulated through the received input, transmitting, to the server device, information indicating that the corresponding GUI element in the remote GUI has been manipulated at the client device.

10. A client device system for generating a local graphical user interface (GUI), the client device system comprising:
    a touch screen configured to display graphical data;
    an input device configured to receive input data;
    a processor; and
    a memory storing instructions that, when executed by the processor cause the processor to perform a method, the method comprising:
       receiving, from a server device connected to the client device, a base image of the remote GUI and UI metadata describing a GUI element in the remote GUI;
       generating the local GUI to be displayed on the touch screen of the client device, the local GUI including the base image received from the server device and a native GUI element to be displayed on the touch screen, the native GUI element generated according to the received UI metadata, the native GUI element corresponding to the GUI element in the remote GUI;
       receiving, at the client device, a voice input through the input device of the client device;
       processing the voice input to determine a command input to manipulate the remote GUI of the server device; and
       transmitting, to the server device, information indicating the command input configured to manipulate the remote GUI.

11. The client device system of claim 10, wherein processing the voice input further comprises:
    generating the command input based on a match of a plurality of rules associating a plurality of pre-determined commands with a corresponding input event to be executed at the server device.

12. The client device system of claim 10, wherein:
    the processing the voice input further comprises processing the voice input to determine a command input to manipulate the remote GUI the native GUI element, wherein the processing is performed based on information from the received UI metadata; and
    the method further comprises transmitting, to the server device, information indicating that the corresponding GUI element in the remote GUI has been manipulated at the client device.

13. The client device system of claim 12, wherein processing the voice input further comprises:
    determining the command input from a plurality of candidate texts based on the command input matching information from the UI metadata that specifies the GUI element of the remote GUI.

14. The client device system of claim 10, wherein the UI metadata comprises semantic information related to contents of the GUI element in the remote GUI, wherein the UI metadata is organized in a tree-like structure.

15. The client device system of claim 10, wherein the generated native GUI element is different than the corresponding GUI element in the remote GUI in at least one of size, shape, color, style, manner of interaction, animation, and interactive behavior.

16. The client device system of claim 10, wherein generating the native GUI element further comprises:
    generating a system-provided control element based on the received UI metadata using a user interface framework local to the client device.

17. The client device system of claim 10, wherein the local GUI element comprises the native GUI element arranged on top of the base image of the remote GUI received from the server device.

18. The client device system of claim 10, wherein the method further comprises:
   receiving, at the client device, a touch input through the local GUI; and
   responsive to determining that the native GUI element has been manipulated through the received input, transmitting, to the server device, information indicating that the corresponding GUI element in the remote GUI has been manipulated at the client device.

19. A non-transitory computer-readable medium storing instructions that, when executed by a processor, cause the processor to perform a method of generating a local graphical user interface (GUI) on a client device that is connected to a server device having a remote GUI, the method comprising:
   receiving, from the server device, a base image of the remote GUI and UI metadata describing a GUI element in the remote GUI;
   generating the local GUI to be displayed on the touch screen of the client device, the local GUI including the base image received from the server device and a native GUI element to be displayed on the touch screen, the native GUI element generated according to the received UI metadata, the native GUI element corresponding to the GUI element in the remote GUI;
   receiving, at the client device, a voice input through an input device of the client device;
   processing the voice input to determine a command input to manipulate the remote GUI of the server device; and
   transmitting, to the server device, information indicating the command input configured to manipulate the remote GUI.

20. The non-transitory computer-readable medium of claim 19, wherein the step of processing the voice input further comprises:
   generating the command input based on a match of a plurality of rules associating a plurality of pre-determined commands with a corresponding input event to be executed at the server device.

* * * * *